July 21, 1925.  1,546,393
F. P. MAISENBACHER
MACHINE FOR MAKING ARTICLES HAVING CONNECTED LINKS
Filed Oct. 19, 1923  3 Sheets-Sheet 3
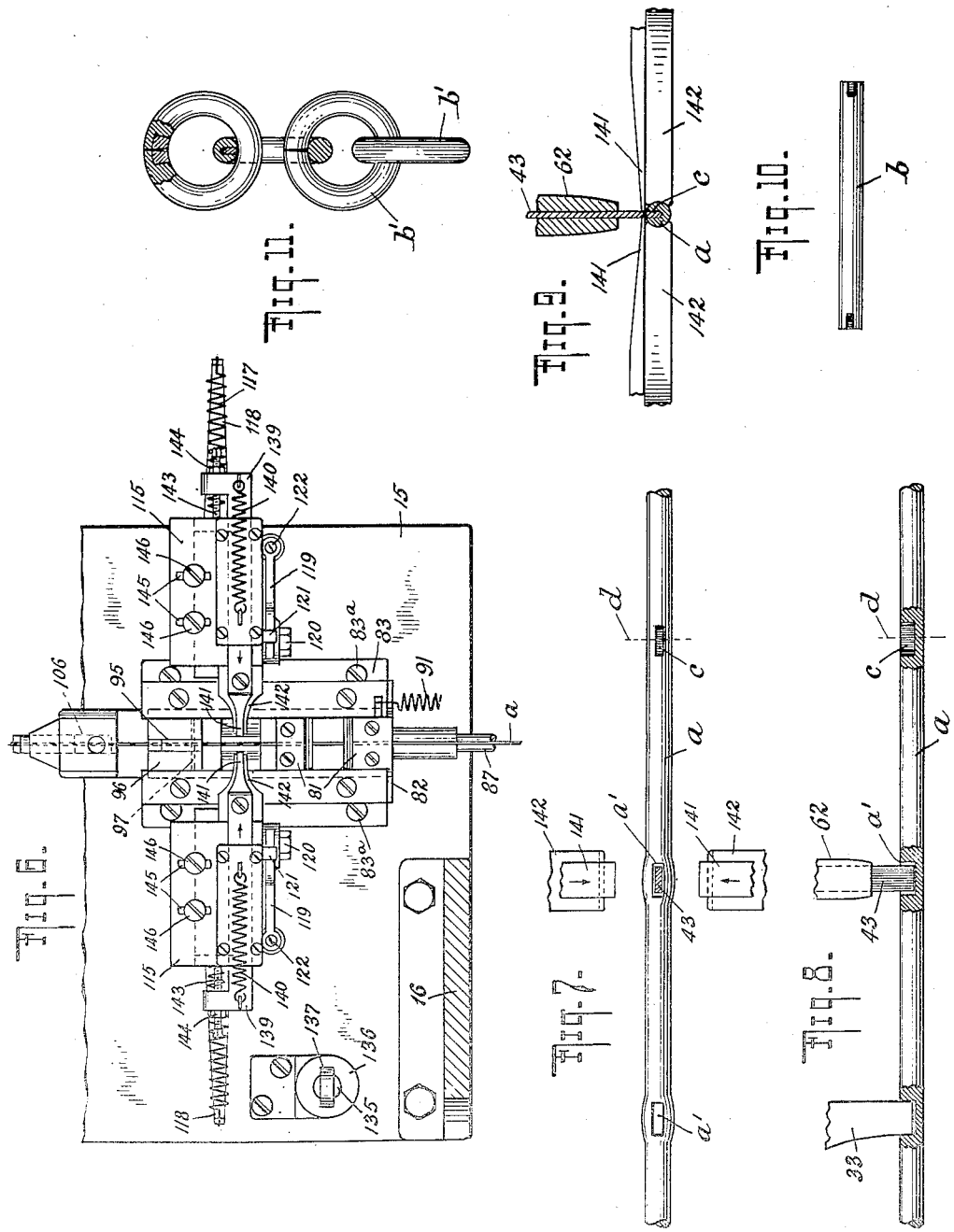
INVENTOR
FRIEDRICH P. MAISENBACHER
BY
ATTORNEYS Patented July 21, 1925.

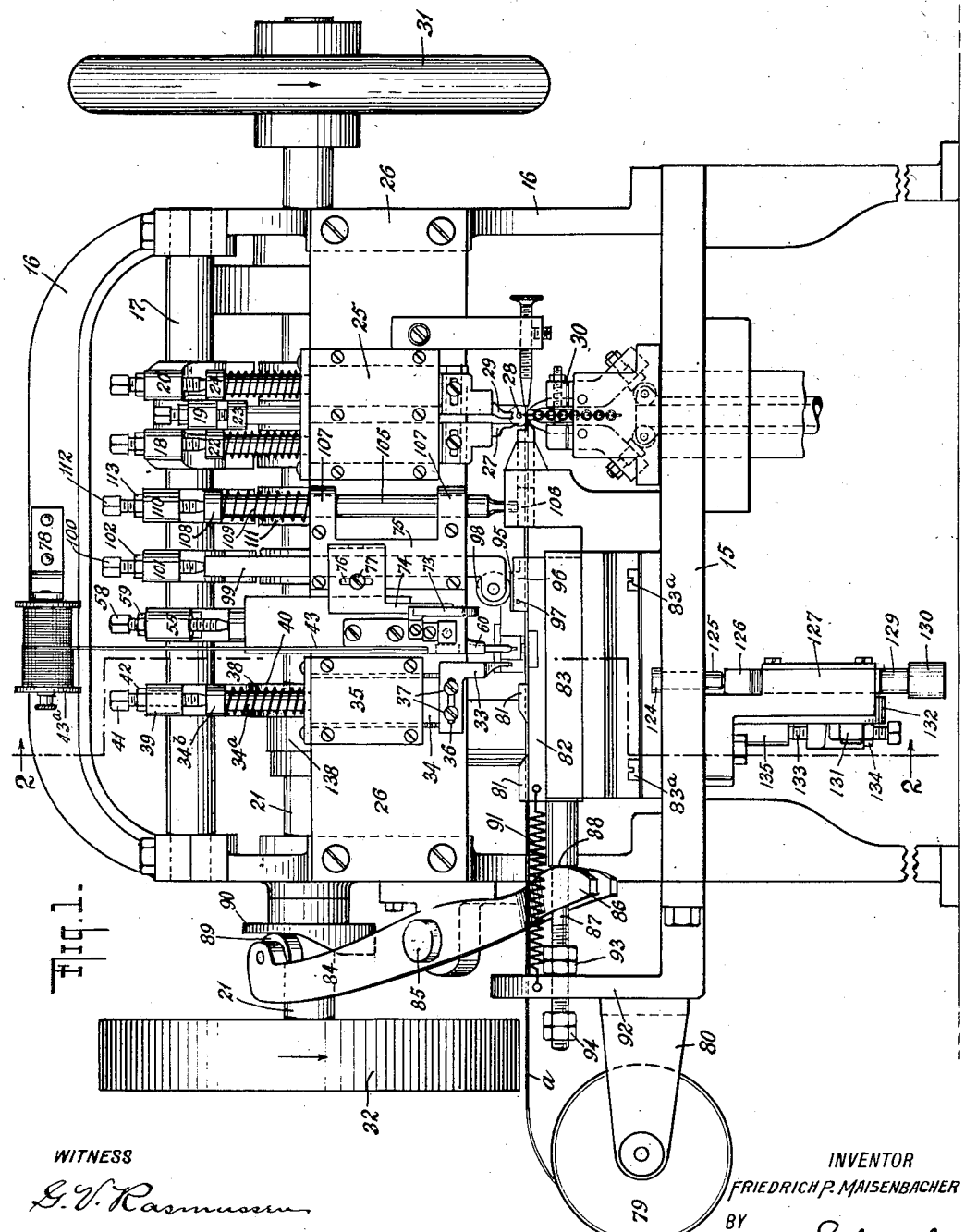

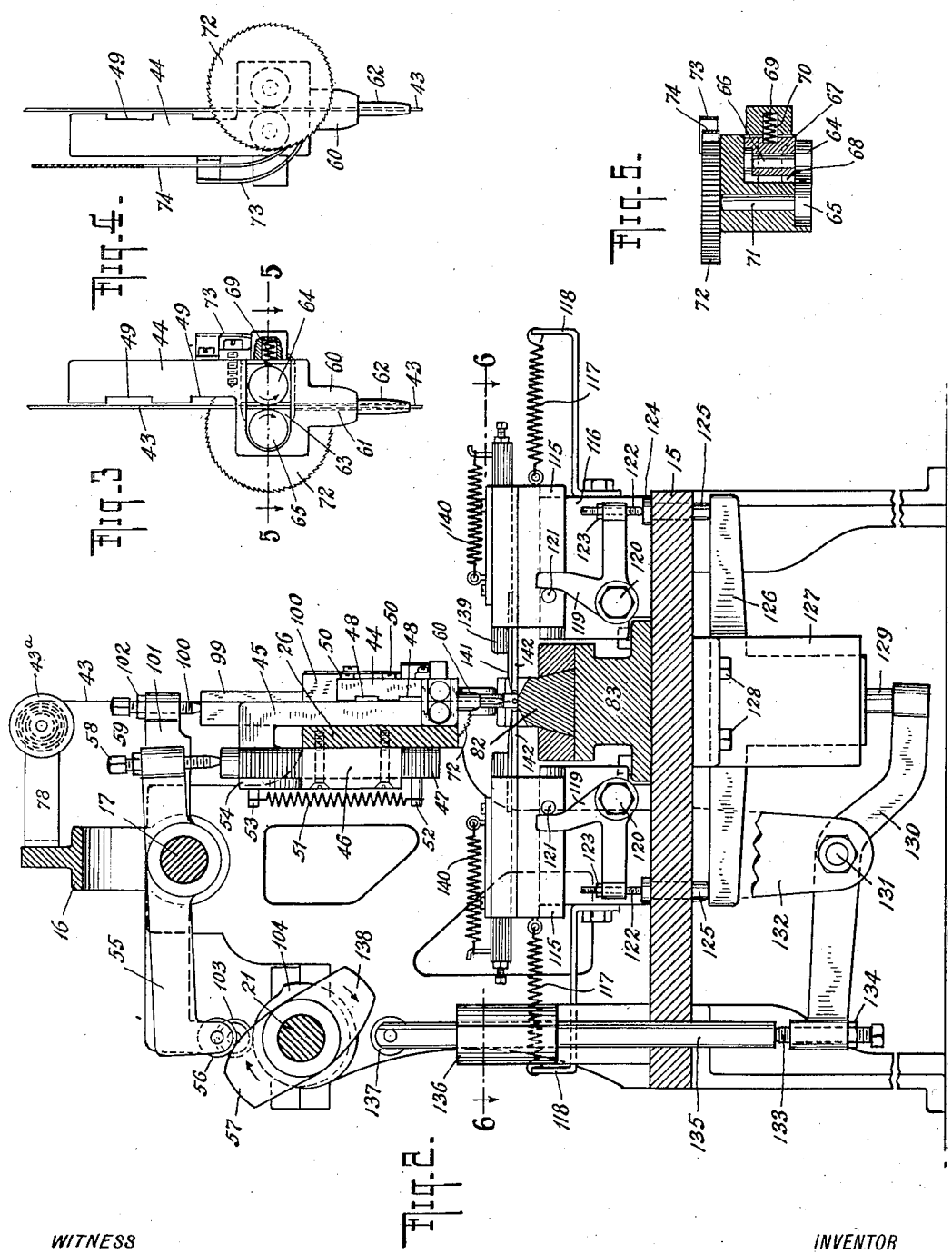

1,546,393

UNITED STATES PATENT OFFICE.

FRIEDRICH P. MAISENBACHER, DECEASED, LATE OF PFORZHEIM, GERMANY; BY PHILIPP MAISENBACHER, EXECUTOR, OF PFORZHEIM, GERMANY, ASSIGNOR TO ERNST GIDEON BEK MANUFACTURING COMPANY, OF NEWARK, NEW JERSEY, A CORPORATION OF NEW JERSEY.

MACHINE FOR MAKING ARTICLES HAVING CONNECTED LINKS.

Application filed October 19, 1923. Serial No. 669,605.

*To all whom it may concern:*

Be it known that FRIEDRICH P. MAISENBACHER, deceased, late a citizen of Germany, and resident of Pforzheim, Germany, has invented certain new and useful Improvements in a Machine for Making Articles Having Connected Links, of which the following is a specification.

My invention relates to rings or links adapted for connection with each other to make articles such as chains, ring-mesh fabric and the like and has for its object to provide a novel method for producing a novel combination of wire and solder prior to the formation of the wire into rings or links. My invention further contemplates the provision of a simple and efficient mechanism whereby the novel method may be carried out to effect the novel combination of solder and wire in an economical and commercial manner. Other objects of the invention will appear from the description hereinafter.

In the accompanying drawings, which illustrate an example of the invention without defining its limits, Fig. 1 is an elevation of a machine with the novel mechanism embodied therein; Fig. 2 is a sectional elevation on the line 2—2 of Fig. 1; Figs. 3 and 4 are detail views of a part of the novel mechanism; Fig. 5 is a detail section on the line 5—5 of Fig. 3; Fig. 6 is a horizontal section on the line 6—6 of Fig. 2; Figs. 7, 8, 9 and 10 are views illustrating successive steps in effecting the novel combination of solder and wire and Fig. 11 is a detail view, partly in section, illustrating an example of connected rings or links constructed in accordance with the invention.

In order to clearly illustrate how the invention is to be applied, I have shown it in conjunction with a machine of an existing type, it being understood that this is only an example and that my improvements may be applied to machines of other existing or approved types.

As shown in the drawings the machine consists of a base or support 15 from which an upright frame 16 projects upwardly, said frame 16 carrying a shaft 17 upon which rocker arms 18, 19 and 20 are mounted; the latter are individually actuated at the proper times by suitable cams located upon a shaft 21 journalled upon the frame 16 to operate plungers 22, 23 and 24 slidably mounted in guiding means 25 secured upon a cross-member 26 carried by the frame 16. The plungers 22, 23 and 24 operate devices 27, 28 and 29 to cut the wire *a* and to form the rings or links *b* in co-operation with the mechanism 30. The shaft 21 carries a fly-wheel 31 and a pulley 32 whereby power is applied thereto by means of a suitable driving belt which has been omitted from the drawings. As so far described the machine may be of any existing or approved type, the elements referred to being intended to be illustrative of equivalent mechanisms in the art.

The improved mechanism comprises a plunger 33 which has its operative end of predetermined dimensions and shape and is carried by a vertically moving slide 34 slidably mounted in guiding means 35 fixed upon the cross-member 26; in the preferred arrangement the plunger 33 is adjustable relatively to the slide 34 in transverse directions and accordingly may, as shown in Fig. 1, be provided with a slot 36 for the accommodation of set screws 37. The slide 34 is provided with an upwardly extending rod 34ª having a head 34ᵇ at its free end which forms an abutment for one end of a spring 38, the other end of which engages the guiding means 35 and which serves to maintain the slide 34 and its plunger 33 in a raised position and to return these elements thereto. The plunger 33 is actuated in a downward, operative direction against the tension of the spring 38 by means of a rocker-arm 39 mounted upon the shaft 17 and itself operated through the medium of a suitable cam 40 carried by the shaft 21; in order to provide for variations in the operative movement of the plunger 33, the rocker-arm 39 may be provided with an adjusting screw 41 arranged to engage the head 34ᵇ and locked in an adjusted position by means of a lock-nut 42.

The improved mechanism further includes means for feeding a strip of solder 43 in steps for the purpose to be more fully explained hereinafter; this feeding means may, as shown, comprise a member 44 carried by a vertically movable slide 45 slidably mounted in guiding means 46 secured upon the rear face of the cross-member 26, the slide 45 being shaped as illustrated in Fig. 2 and including dove-tail projections 47 at opposite sides to fit corresponding grooves of the guiding means 46. To rigidly fix the member 44 upon the slide 45 the latter may be provided with lugs 48 adapted to fit into recesses 49 of the member 44 which is secured in place by means of screws 50. A spring 51 serves to normally maintain the slide 45 and its associated parts in a raised position and to return it thereto and, as shown, may have its one end connected with a pin 52 carried by the slide 45 and its other end secured to a pin 53 located upon a projection 54 extending upwardly from the guiding means 46 and consequently constituting a stationary part of the machine. The slide 45 and the elements carried thereby are operated, in the illustrated example, by means of a rocker-arm 55 mounted upon the shaft 17 and provided at one end with a roller 56 arranged in engagement with a cam 57 whereby said rocker-arm 55 is actuated; the cam 57 is fixed upon the shaft 21 as shown in Fig. 3. For the purpose of varying the sliding movements of the slide 45 and its co-related elements, the rocker-arm 55 may be provided at its other end with an adjusting screw 58 adapted to engage the upper end of the slide 45 as illustrated in Fig. 3, and locked against unintentional movement in the arm 55 by means of a lock nut 59.

The member 44 is provided with a depending member 60 having a passage 61 extending therethrough in registry with the bore of a guide sleeve 62 which comprises a depending continuation of said member 44, it being understood that the passage 61 and bore of the sleeve 62 correspond in cross-sectional form to the shape of the strip of solder 43 which is designed to pass therethrough as will be more fully set forth hereinafter. In a recess 63 the member 44 is provided with combined clamping and feeding rollers 64 and 65, which are so positioned as to have peripheral engagement with each other in alignment with the passage 61; the roller 64 is carried by a stud 66 which is journalled in a block 67 movably fitted in a recess 68 of the member 44. A spring 69, which may be set into a socket 70 as shown in Figs. 3 and 5, serves to exert a pressure upon the block 67 whereby the roller 64 is yieldingly pressed toward the roller 65; the latter, as shown, is fixed upon one end of a shaft 71 journalled in the member 44 and connected at its other end with a ratchet wheel 72 which is engaged by a stop-pawl 73 secured upon the member 44 as illustrated in Fig. 4. An operating pawl 74 also engages said ratchet wheel 72 and is secured upon a suitable stationary portion of the machine as, for instance, a guiding means 75 carried by the cross-member 26 as shown in Fig. 1. The operating pawl 74, which is stationary and performs its functions in the manner to be more fully set forth hereinafter, is preferably adjustable to vary its effect upon said ratchet wheel 72; for this purpose said pawl 74 may be formed with a slot 76 for the accommodation of a set screw 77 as illustrated in Fig. 1. The strip of solder 43 is preferably carried upon a spool 43$^a$ rotatably mounted upon a bracket 78 which may be fixed upon the frame 16 at a suitable place as shown, for instance, in Fig. 1.

The wire $a$ which constitutes the material from which the links $b$ are to be made is carried upon a drum 79 journalled in brackets 80 secured upon the base 15 and passes through guides 81 forming part of or secured to a reciprocable block 82 located beneath the plunger 33 and the depending end of the solder strip 43 as illustrated in Figs. 1 and 2; the block 82 comprises part of the feeding mechanism for intermittently feeding the wire $a$ in the direction of its length and is slidably mounted in stationary guiding means 83 fixed upon the base 15 in any convenient manner as by bolts 83$^a$. The reciprocation of the block 82 for effecting the step by step feeding of the wire $a$ as will be more fully set forth hereinafter, may be accomplished in any suitable manner as by means of a lever 84 pivoted at 85 upon the frame 16 and having its one end forked as indicated at 86. The forked end 86 straddles a rod 87 which projects from the block 82 and is formed with a shoulder 88 against which the end 86 of the lever 84 abuts as shown in Fig. 1; the opposite end of the lever 84 carries a roller 89 arranged in engagement with a suitably shaped cam 90 located upon the shaft 21. A spring 91 has its one end attached to the block 82 and its other end connected with a bracket 92 mounted upon the frame 15 and serves to operate the block 82 in a return movement and to maintain the roller 89 in engagement with the cam 90; the rod 87 is slidably mounted in the bracket 92 and further has its free end screw-threaded to receive nuts 93 and 94 which serve as adjustable stops in co-operation with said bracket 92 to arrest the reciprocating movements of said block 82.

During the operative movement of the block 82 in the feeding direction, the wire $a$ is clamped thereon in the following manner so as to partake of this feeding movement and to be advanced thereby to a predetermined extent. A clamping member 95 is mounted between guides 96 upon the block 82 so as to be capable of slight vertical movements relatively thereto and is held against complete removal therefrom by means of a pin 97 which passes loosely through said member 95; in other words the latter is provided with an oversize aperture for the pin 97 which allows sufficient play to permit the member 95 to function in the intended manner. A roller 98 co-operates with the member 95 in a manner to be more fully set forth hereinafter and is journalled upon a plunger 99 vertically slidable in the previously mentioned guiding means 75 secured upon the cross-member 26. The upper end of the plunger 99 is engaged by a screw 100 adjustably mounted in one end of a rocker arm 101 and locked in an adjusted position thereon by means of a lock nut 102; the rocker arm 101 is carried by the shaft 17 and is provided at its other end with a roller 103 arranged to engage a cam 104 fixed upon the shaft 21 and constituting the means whereby said rocker arm 101 is actuated. For the purpose of holding the wire $a$ against a return movement during the movement of recovery of the block 82 and its co-related parts, a clamping plunger 105 is provided and is arranged to engage a clamping device 106 at the proper time as will be described more fully hereinafter. The plunger 105 is vertically slidable in guiding means 107 mounted upon the cross-member 26 and is provided with a head 108 against which one end of a spring 109 abuts, the other end of said spring being in engagement with the guiding means 107; the spring 109 serves to maintain the plunger 105 in its normal raised position and to return it thereto. The plunger 105 is operated by means of a rocker arm 110 carried by the shaft 17 and itself operated through the medium of a suitably shaped cam 111 secured upon the shaft 21; for the purposes of adjustment the arm 110 may be provided with a screw 112 adapted to bear against the head 108 and fixed against unintentional movement by means of a lock nut 113.

It will be understood that the plungers 99 and 105 operate in opposition to each other, the controlling cams being shaped to produce this result and are so timed that when the plunger 99 is operating to clamp the wire $a$ upon the block 82, the plunger 105 will occupy an inoperative position and vice versa.

The machine further includes mechanism whereby the strip of solder 43 is cut into plugs $c$ and combined with the wire $a$. This mechanism comprises carriages 115 slidably mounted upon guides 116 which project upwardly from the base 15 at opposite sides of the slidable plug 82 and its associated elements as shown in Fig. 2. The carriages 115 are movable toward each other in the manner to be more fully described hereinafter and are maintained in their normal separated positions and returned thereto by springs 117, which are connected at one end with each carriage and at the other end with brackets 118 fixed upon the guides 116 as shown in Fig. 2. The mechanism whereby said carriages are moved toward each other against the tension of the spring 117 comprises bell crank levers 119 pivoted at 120 upon the guides 116 and having one member in engagement with a pin or projection 121 projecting from each carriage 115. The other end of each bell crank lever is provided with an adjustable screw 122 fixed against unintentional movement by means of a lock nut 123 and bearing against the head 124 of a plunger 125 slidably mounted in the base 15 as shown in Fig. 2. It will be understood that each carriage 115 is provided with its co-operating bell crank lever 119 and that the screw 122 of each bell crank lever in turn engages the head 124 of the co-operating plunger 125. The two plungers 125 rest upon a T-shaped member 126 which is vertically slidable in a guideway 127 depending from the base 15 and secured thereto, for instance, by means of bolts 128. The member 126 is provided with a depending stud 129 which engages one end of a lever 130 pivoted at 131 upon a bracket 132 which is secured to and depends from the base 15. The opposite end of the lever 130 carries an adjustable screw 133 fixed in place by means of a lock nut 134 and engaging the lower end of a rod 135 as shown in Fig. 2. The rod 135 passes slidably through the base 15 and is slidably mounted in a bearing bracket 136 which projects upwardly from and is fixed upon the base 15. At its upper end the rod 135 carries a roller 137 arranged to be engaged by a cam 138 mounted upon the shaft 21 and which constitutes the means whereby the mechanism being described is actuated. Each carriage 115 is provided with a slide 139 which is yieldingly fixed in position upon the carriage by means of a spring 140 and carries a cutter 141 and a pressure member 142 having its free end concaved to correspond to the circumferential form of the wire $a$. As shown in Fig. 6 each slide 139 may be provided with an adjustable stop screw 143 adapted to bear against the carriage 139 and thereby arrest the independent movement of the slide 139 relatively to the carriage in one direction; a lock nut 144 may be provided for fixing each stop screw 143 in an adjusted position. For the purpose of adjustment each carriage 115 may be provided with slots 145 adapted to accommodate screws 146 as shown in Fig. 6.

In practice power is applied to rotate the pulley 32 and with it the shaft 21 and thereby to bring about the operation of the various mechanical elements in the manner now to be described, it being assumed that the wire $a$ has been properly attached to the slide 82 and that the strip of solder 43 has been properly connected with its feeding mechanism and that said wire has been brought to its initial position beneath the plunger 33. As the operation of the mechanism now goes on the rocker arm 39 will be operated by its cam 40 to depress the plunger 34ª against the tension of the spring 38 and to thereby cause the plunger 33 to descend into contact with the wire $a$ and to form a recess $a'$ therein as shown in Fig. 7; it will be understood that the plunger 33 does not cut away any of the metal of which the wire is composed but that it displaces such metal in the manner indicated to the left in Fig. 7 in the formation of such recess $a'$; that is to say, the metal of the wire is bulged outwardly in registry with said recess $a'$. During the operation of the parts just described, that is, during the formation of the recess $a'$, the roller 98 occupies a position in which it exerts a pressure upon the member 95 to clamp the wire $a$ upon the slide 82. After the recess $a'$ has been formed in the indicated manner the cam 90 will act upon the roller 89 in a manner to swing the forked end 86 of the lever 84 toward the right in Fig. 1 and thereby to correspondingly move the slide 82 against the tension of the spring 91 until the nuts 94 abut against the bracket 92. During this movement of the slide 82 the pressure of the roller 98 upon the member 95 continues so that the wire $a$ is clamped upon the slide 82 and partakes of the movement thereof with the result that said wire $a$ is fed toward the right to a predetermined extent. As the slide 82 commences a movement of recovery because of the continued operation of the machine, the clamping plunger 105 will be forced downwardly by the action of the cam 104 upon the rocker arm 101 and will clamp the clamping device 106 upon the wire $a$; the latter is thus held against a return movement in the position to which it has been fed so that the movement of recovery of the slide 82 is independently of and relatively to the wire $a$. This feeding operation has brought the previously formed recess $a'$ into registry with the depending end of the strip of solder 43 and has moved a new portion of said wire into alignment with the plunger 33. As the machine now continues to operate the plunger 33 is again caused to descend and to form a second recess $a'$ in the wire $a$ at a distance from the first one as shown in Fig. 7; at the same time the slide 45 is caused to descend by the action of the rocker arm 55 and cam 57 and carries with it the member 44. By the action of the rollers 64 and 65 which at this stage and during the downward movement of the slide 45, exert a gripping force upon the strip of solder 43, the latter is drawn downwardly and has its lower end projected into the previously formed recess $a'$ as shown in Figs. 7 and 8. As soon as this insertion of the end of the solder strip 43 into the recess $a'$ has been accomplished, and before the feed member 44 begins a return movement, the carriages 115 are moved toward each other by the action of the cam 138 upon the rod 135 and the cutters 141 are thereby moved from opposite directions to cut the strip of solder at its lower end to form a plug $c$; at the same time the pressure members 142 are brought into engagement with the outwardly deformed portion of the wire in registry with the recess $a'$ and the plugs $c$ therein and are caused to exert a pressure thereon whereby the bulges are reduced and the wire is restored to its former condition. The plug of solder is in this manner firmly clamped in said recess $a'$ as shown to the right in Figs. 7 and 8. If, for any reason, it becomes necessary, the slides 139 which carry the cutters 141 and the pressure members 142, may yield against the action of the springs 140 so that any force tending to injure either the cutters or the pressure members or both, is neutralized, it being understood that the slides 139 partake of the movements of the carriages 115 as a unit until any force tending to bring about a relative movement of the slides 139, is encountered. As soon as the plug $c$ has been cut from the strip 43 the parts begin movements of recovery in which the slide 45 and with it the member 44 rise upwardly to their normal positions. As this occurs the ratchet wheel 72 is rotated by the action of the operating pawl 73 which is stationary relatively to the slide 45 and the member 44; in other words, the ratchet 72, during the movement of recovery of the parts, moves in an upward direction relatively to the pawl 73 and thus is given a partial revolution to whatever extent the adjustment of said operating pawl 73 may predetermine. This actuation of the ratchet 72 correspondingly rotates the shaft 71 and with it the roller 65 which in co-operation with the roller 64 thus constitutes a feeding means whereby the strip of solder 73 is fed in a downward direction to an extent sufficient to replace the plug $c$ previously cut therefrom and to thereby provide material for the next succeeding plug. During this operation of the parts the action of the cam 90 on the lever 84 will be such as to permit the carriage 82 to be drawn toward the left in Fig. 1 by the spring 91 and to thereby resume its normal position, it being understood that this movement of recovery of the carriage 82 takes place at the proper predetermined time; as previously stated at this stage the clamping plunger 105 is operative to clamp the wire against a return movement while the roller 98 is inoperative upon the clamping member 95. As the operation of the machine continues the wire $a$ is advanced in period stages and positioned in a manner to permit the formation of successive recesses $a'$ therein at predetermined spaced intervals and to co-incidentally position plugs of solder $c$ in the recess previously formed and to secure such plugs therein. As the wire with the plugs of solder $c$ secured therein is advanced, it will finally reach the cutter 29 in such position that the transverse center line of a plug of solder $c$ is in registry with the cutting edge of said cutter 29 as indicated by the dotted line $d$ in Figs. 7 and 8. At the proper time this cutter 29 descends and cuts the wire on the dotted line $d$ thus leaving one-half of a plug of solder $c$ in one section $b$ of the wire and the other half of said plug of solder in the next succeeding section thereof; the final result of this is that each length of wire $b$ sufficient to constitute one link contains in its opposite ends one-half of a previous plug of solder $c$ located in one-half of the previously formed recess $a'$. By the action of the customary elements indicated by the reference characters 28, 29 and and 30 in the drawings, these sections $b$ are bent in the form of rings or otherwise shaped to constitute links $b'$ and are combined with each other, for instance, in the manner indicated in Fig. 11. In this condition the opposite ends of the section $b$, which now comprise links or rings $b'$, are brought into contiguous relation and registry with each other with the halves of the plugs $c$ in juxtaposition as illustrated in Fig. 11; after the predetermined number of links $b'$ have been combined in the predetermined manner they are subjected to the action of the customary means whereby the solder is fluxed to permanently unite the ends of the links or rings and to complete the formation thereof. It will be seen that the invention provides a novel method of combining the solder with the links or rings and thus provides a novel link construction and, in addition, provides a simple machine whereby the method may be carried out and the links produced in an efficient and commercial manner.

Various changes in the specific form shown and described may be made within the scope of the claims without departing from the spirit of my invention.

I claim:

1. In a machine for making rings or links, the combination of means for holding the wire from which the rings or links are to be formed, means for forming recesses in said wire at predetermined points, a solder feeding device spaced from said recess-forming means for introducing solder into said recesses successively as the wire is advanced step by step in line with said solder feeding device, means to fix the solder in said recesses, and a cutting device adapted to sever a ring blank from said wire in proximity to the solder after the solder is fixed therein.

2. In a machine for making rings or links, the combination of means for holding the wire from which the rings or links are to be formed, means for feeding the end of the wire to ring-forming mechanism, recess-forming implements spaced in advance of said ring-forming mechanism adapted to form recesses in said wire inside of the free end thereof, a solder feeding device, means to advance said wire in line with said solder feeding device, said solder feeding device being adapted to insert solder in said recesses successively, and means to periodically sever sections of said wire into ring blanks.

3. In a machine for making rings or links, the combination of means for holding the wire from which the rings or links are to be formed, means for feeding the end of the wire to ring-forming mechanism, recess-forming implements spaced in advance of said ring-forming mechanism adapted to form recesses in said wire inside of the free end thereof, a solder feeding device; means to advance said wire in line with said solder feeding device, said solder feeding device being adapted to insert a section of solder longitudinally in said recesses, and means to periodically sever sections of said wire into ring blanks.

4. In a machine for making rings or links, the combination of means for holding the wire from which the rings or links are to be formed, means for feeding the end of the wire to ring-forming mechanism, recess-forming implements spaced in advance of said ring-forming mechanism adapted to form recesses in said wire inside of the free end thereof, a solder feeding device; means to advance said wire in line with said solder feeding device, said solder feeding device being adapted to insert a section of solder longitudinally in said recesses, and means to periodically sever the wire across said wire and solder to form ring blanks.

5. In a machine for making rings or links, the combination of means for holding the wire from which the rings or links are to be made, means for feeding said wire to ring-forming implements, means to form recesses in said wire and for bulging the wire outwardly at said recesses as the wire is fed past said recess-forming means, the distance from recess to recess being equal to the length of a ring blank, a device spaced from said recess-forming means for inserting solder in said recesses as the recesses are fed in alinement therewith, mean to press said bulges inwardly to secure the solder in the recesses, and means between said bulge-reducing means and said ring-forming implements to sever the wire into ring blanks.

6. In a machine for making rings or links, the combination of means for intermittently feeding the wire from which the rings or links are to be made, a plunger for forming recesses in said wire at spaced intervals, and thereby bulging said wire outwardly in registry with said recesses, means for introducing the end of a strip of solder into individual recesses, means for cutting said strip to form a plug of solder in said recess, and means for reducing the bulge of said wire by pressure to clamp said plug of solder in said recess.

7. In a machine for making rings or links, the combination of a wire carrier from which the rings or links are to be made, means for feeding said wire in predetermined steps, a plunger for forming recesses in said wire at spaced intervals, a strip of solder, means for introducing the end of said strip into successive recesses, combined cutting and clamping means whereby the end of said strip of solder is cut to form a plug of solder in said recess and said plug is clamped therein, and means for cutting said wire in registry with said plugs into sections to form the rings or links.

8. In a machine for making rings or links, the combination of a wire carrier from which the rings or links are to be made, a reciprocable slide, means for clamping said wire to said slide during its movement in one direction and for releasing said wire during the movements of said slide in the reverse direction, means for clamping said wire against a return movement during the reverse movements of said slide whereby said wire is fed in predetermined steps and held, means for forming recesses in said wire at spaced intervals, means for fixing plugs of solder in said recesses, means for cutting said wire into sections on lines which pass through said plugs of solder, and means for bringing the opposite ends of said sections of wire and the plugs of solder thereat into juxtaposition to each other.

9. In a machine for making rings or links, the combination of a wire carrier from which the rings or links are to be made, means for feeding said wire in predetermined steps, a plunger for forming recesses in said wire at spaced intervals and for bulging the wire outwardly at said recesses, a strip of solder, vertically reciprocable means for introducing the end of said strip of solder into successive recesses, cutting means whereby the strip is cut to form plugs of solder in said recesses, means for reducing the bulges of said wire by pressure to clamp said plugs in said recesses, and means whereby said vertically reciprocable means is actuated during its return movement to advance said strip of solder a distance corresponding to the plug cut therefrom.

10. In a machine for making rings or links, the combination of a wire carrier from which the rings or links are to be made, means for feeding said wire in predetermined steps, a plunger for forming recesses in said wire at spaced intervals and for bulging the wire outwardly at said recesses, a strip of solder, a vertically movable slide, clamping means for clamping said strip of solder during the downward movement of said slide whereby the end of said strip is introduced into a recess of the wire, cutting means for cutting said strip at said end to form a plug of solder in said recess, means for reducing the bulges of said wire by pressure to clamp the plug of solder in said recess, and means whereby said clamping is actuated during the return movement of said slide to advance said strip of solder a distance corresponding to the plug cut therefrom.

11. In a machine for making rings or links, the combination of a wire carrier from which the rings or links are to be made, means for feeding said wire in predetermined steps, a plunger for forming recesses in said wire at spaced intervals and for bulging the wire outwardly at said recesses, a strip of solder, a vertically movable plunger slide carrying said plunger, a vertically movable solder slide having a depending guide sleeve, a strip of solder passing through said guide sleeve and projecting beyond the end thereof, a pair of co-operating rolls on said solder slide adapted to clamp said strip of solder during the downward movement of said member whereby the end of said strip is introduced into a recess of the wire, cutting means for cutting said strip to form a plug of solder in said recess, means for reducing the bulges of said wire by pressure to clamp the plug of solder in said recess, a stationary feed pawl and a ratchet carried by said solder slide and connected with one of said rolls, said ratchet being operated by said stationary pawl during a return movement of said solder slide whereby said rolls are actuated to advance said strip of solder a distance corresponding to the plug cut therefrom.

12. In a machine for making rings or links, the combination of means for feeding the wire from which the rings or links are to be made, in predetermined steps, means for forming recesses in said wire at spaced intervals, a vertically movable slide, a strip of solder, a pair of co-operating rolls on said slide adapted to clamp said strip of solder during the downward movement of said slide whereby the end of said strip is introduced into a recess of the wire, means for cutting said strip to form a plug of solder in said recess and for fixing it therein, and pawl and ratchet mechanism adapted to operate said rolls, during the return movement of said slide, to advance said strip of solder a distance corresponding to the plug cut therefrom.

13. In a machine for making rings or links, the combination of means for intermittently feeding the wire from which the rings or links are to be made, means for forming recesses in said wire at spaced intervals, means for introducing the end of a strip of solder into successive recesses, a pair of slides movable toward and away from each other, cutting devices yieldingly carried by said slides, and means for moving said slides toward each other whereby said cutting devices are caused to cut said strip to form a plug of solder in successive recesses.

14. In a machine for making rings or links, the combination of means for intermittently feeding the wire from which the rings or links are to be made, a plunger for forming recesses in said wire at spaced intervals and thereby bulging said wire outwardly in registry with said recesses, means for introducing the end of a strip of solder into successive recesses, a pair of co-operating slides, combined cutting and clamping means carried by said slides, and means for moving said slides toward each other to cause said cutting and clamping means to cut said strip to form a plug of solder in successive recesses and to reduce said bulges and thereby clamp the plugs in said recesses.

15. In a machine for making rings or links, the combination of means for intermittently feeding the wire from which the rings or links are to be made, a plunger for forming recesses in said wire at spaced intervals and thereby bulging said wire outwardly in registry with said recesses, means for introducing the end of a strip of solder into successive recesses, a pair of co-operating slides, combined cutting and clamping means yieldingly carried by said slides, means for moving said slides toward each other to cause said cutting and clamping means to cut said strip to form plugs of solder in successive recesses and to reduce said bulges and thereby clamp the plugs in said recesses, and springs for returning said slides to their normal positions.

16. In a machine for making rings or links, the combination of a wire carrier from which the rings or links are to be made, a reciprocable slide, means for clamping said wire to said slide during its movement in one direction and for releasing said wire during the movements of said slide in the reverse direction, means for clamping said wire against a return movement during the reverse movements of said slide whereby said wire is fed in predetemined steps and held, a plunger for forming recesses in said wire at spaced intervals, a vertically movable plunger slide carrying said plunger, a vertically movable solder slide having a depending guide sleeve, a strip of solder passing through said guide sleeve and projecting beyond the end thereof, a pair of co-operating rolls on said solder slide adapted to clamp said strip of solder during a downward movement of said solder slide whereby the end of said strip is introduced into a recess of the wire, a pair of co-operating slides, cutting and clamping means carried thereby, means for operating said co-operating slides to cause the cutting and clamping means to cut said strip to form a plug of solder in successive recesses and to clamp the plugs therein, and pawl and ratchet mechanism adapted to operate said rolls, during a return movement of said solder slide, to advance said strip of solder a distance corresponding to the plug cut therefrom.

17. A machine for making rings or links comprising a support, a wire carrier mounted thereon, a feed slide, means for reciprocating said feed slide, means for clamping said wire to said feed slide during its movements in one direction and for releasing said wire during the movements of said feed slide in the reverse direction whereby said wire is fed in steps, means for clamping said wire against a return movement during the reverse movements of said feed slide, a plunger for forming recesses in said wire at spaced intervals and for bulging said wire outwardly at said recesses, a vertically movable plunger slide carrying said plunger, a vertically movable solder slide having a depending guide sleeve, a strip of solder passing through said sleeve and projecting beyond the end thereof, a pair of co-operating rolls on said solder slide for clamping said strip of solder during a downward movement of said solder slide whereby the end of said strip is introduced into a recess of said wire, a pair of co-operating slides, combined cutting and clamping means carried by said co-operating slides, means for operating said co-operating slides transversely to said feed slide to cause the cutting and clamping means to cut said strip to form a plug of solder in successive recesses and to clamp the plugs therein, a stationary feed pawl and a ratchet carried by said solder slide and connected with one of said rolls, said ratchet being operated by said stationary pawl, during a return movement of said solder slide, whereby said rolls are actuated to advance said strip of solder a distance corresponding to the plug cut therefrom.

In testimony whereof I have hereunto set my hand.

PHILIPP MAISENBACHER,
*Executor of the estate of Friedrich P. Maisenbacher, deceased.*